(12) United States Patent
Huang et al.

(10) Patent No.: US 10,588,040 B2
(45) Date of Patent: Mar. 10, 2020

(54) MEASUREMENT GAP CONFIGURATION IN DUAL CONNECTIVITY ENHANCEMENT

(71) Applicant: Intel IP Corporation, Santa Clara, CA (US)

(72) Inventors: Rui Huang, Beijing (CN); Yang Tang, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/565,726

(22) PCT Filed: Dec. 23, 2015

(86) PCT No.: PCT/US2015/000272
§ 371 (c)(1),
(2) Date: Oct. 11, 2017

(87) PCT Pub. No.: WO2016/182527
PCT Pub. Date: Nov. 17, 2016

(65) Prior Publication Data
US 2018/0077596 A1    Mar. 15, 2018

Related U.S. Application Data

(60) Provisional application No. 62/161,779, filed on May 14, 2015.

(51) Int. Cl.
*H04W 24/10* (2009.01)
*H04W 24/08* (2009.01)
(Continued)

(52) U.S. Cl.
CPC .......... *H04W 24/10* (2013.01); *H04W 24/08* (2013.01); *H04W 76/27* (2018.02); *H04W 76/28* (2018.02); *H04W 88/06* (2013.01)

(58) Field of Classification Search
None
See application file for complete search history.

(56) References Cited

U.S. PATENT DOCUMENTS

| 2015/0036666 A1* | 2/2015 | Blankenship | H04W 56/0045 370/336 |
| 2015/0271726 A1* | 9/2015 | Kim | H04W 36/0055 370/329 |

(Continued)

OTHER PUBLICATIONS

International Search Report and Written Opinion dated Mar. 14, 2016, from International Application No. PCT/US2015/000272, 14 pages.

(Continued)

*Primary Examiner* — Edan Orgad
*Assistant Examiner* — Emmanuel K Maglo
(74) *Attorney, Agent, or Firm* — Fish & Richardson P.C.

(57) ABSTRACT

In embodiments, a UE may measure system frame number (SFN)/subframe timing differences between a master eNB (MeNB) and secondary eNB (SeNB) for dual connectivity (DC). When network-based reporting on the SFN/subframe timing offset is used, no new radio access network (RAN) signaling may be needed. However, in the case of multi-vendor deployments, no network coordination via different Operations, Administration, and Maintenance (OAM) for DC may occur. In this case, the network may not be able to obtain SFN/subframe timing offset information. To address this issue, various embodiments disclosed herein include UE-based reporting on SFN/subframe offset between an MeNB and an SeNB.

6 Claims, 12 Drawing Sheets

(51) Int. Cl.
*H04W 76/28* (2018.01)
*H04W 76/27* (2018.01)
*H04W 88/06* (2009.01)

(56) References Cited

U.S. PATENT DOCUMENTS

| | | | | |
|---|---|---|---|---|
| 2015/0327104 A1* | 11/2015 | Yiu | ............... | H04W 24/10 |
| | | | | 455/450 |
| 2015/0327107 A1* | 11/2015 | Kim | ............... | H04B 7/024 |
| | | | | 370/252 |
| 2016/0088534 A1* | 3/2016 | Axmon | ............ | H04W 36/0083 |
| | | | | 370/252 |
| 2017/0013565 A1* | 1/2017 | Pelletier | ............. | H04W 52/146 |
| 2017/0064578 A1* | 3/2017 | Takahashi | ............... | H04W 8/22 |
| 2017/0134976 A1* | 5/2017 | Uchino | ................ | H04W 16/32 |
| 2017/0366313 A1* | 12/2017 | Rahman | ............... | H04L 5/0032 |
| 2017/0367045 A1* | 12/2017 | Rahman | ........... | H04W 52/0216 |

OTHER PUBLICATIONS

Qualcomm Incorporated, "Measurement gap configuration in Dual Connectivity," 3GPP TSG-RAN WG2 meeting #86, R2-142517, Agenda item: 7.1.2, May 19-23, 2014, Seoul, KR, 3 pages.

ZTE, "Measurement Gap and interruption requirements in unsynchronized operation for Dual Connectivity," 3GPP TSG-RAN WG4 Meeting #72bis, R4-145670, Agenda item: 7.13.3, Oct. 6-10, 2014, Singapore, 3 pages.

Huawei et al., "Discussion on enhanced dual connectivity," 3GPP TSG-RAN WG4 Meeting #74bis, R4-151730, Agenda Item: 7.9.3, Apr. 20-24, 2015, Rio de Janeiro, Brazil, 3 pages.

Intel Corporation, "Discussion on UE reporting of SFN/subframe offset for DC enhancement," 3GPP TSG-RAN WG4 Meeting #75, R4-152766, Agenda Item: 7.9.3.1, May 25-29, 2015, Fukuoka, Japan, 6 pages.

* cited by examiner

*VarTimingOffsetofSCGReport*

The UE variable TimingOffsetofSCGReport includes the parameters needed to align the measurement gap or DRX between MCG and SCG.

700

```
-- ASN1START
VarTimingOffsetofSCGReport::=   varTimingOffsetofSCGReport-r13

TimingOffsetofSCGReport -13 : :   SEQUENCE {
    FrameTiming_offset                INTEGER (-4...5)
    IndicatorSyncDC                   Boolean(true, false)
    SFN_offset                        INTEGER(0,....1024)
}
-- ASN1STOP
```

| *VarShortMAC-Input* field descriptions |
|---|
| *FrameTiming_offset* <br> The frame boundary offset reported to the network (in Subframe granularity) can be: <br> $FrameTiming\_offset = floor(T\_offset/1000)$ <br> $T\_offset\_Frame$ is the frame boundary timing offset between MCG and SCG: <br> $T\_offset\_Frame = T\_mcg - T\_scg$ |
| *IndicatorSyncDC* <br> The indication of asyn/sync DC which can be derived by: <br> *If mod(abs(T_offset_Frame), 500) < 33* <br>     *IndicatorSyncDC = true;* <br> *Else* <br>     *IndicatorSyncDC = false;* <br> end |
| *SFN_offset* <br><br> SFN timing difference between MCG and SCG can be calculated from the received MIBs of MeNB and SeNB. <br> $SFN\_offset = SFN\_MCG - SFN\_SCG$ [Frame level] |

FIG. 7

5.5.2.9 Measurement gap configuration
The UE shall:
    1>      if *measGapConfig* is set to *setup*:
        2>      if a measurement gap configuration is already setup, release the measurement gap configuration;
        2>      setup the measurement gap configuration indicated by the *measGapConfig* in accordance with the received *gapOffset*, i.e., the first subframe of each gap occurs at an SFN and subframe meeting the following condition (SFN and subframe of MCG cells):

SFN mod $T$ = FLOOR(*gapOffset*/10);
             subframe = *gapOffset* mod 10;
             with $T$ = MGRP/10 as defined in TS 36.133 [16];

2>      for DC measurement gap configuration of MCG and SCG, the MCG gap pattern can be configured as
             •      setup the measurement gap configuration indicated by the *measGapConfig* in accordance with the received *gapOffset*, i.e., the first subframe of each gap occurs at an SFN and subframe meeting the following condition (SFN and subframe of MCG cells):

SFN mod $T$ = FLOOR(*gapOffsetMCG*/10);
             subframe = *gapOffsetMCG* mod 10;
             with $T$ = MGRP/10 as defined in TS 36.133 [16]

The SCG gap pattern shall be aligned with that of MCG based on the reported parameter in
             "VarTimingOffsetofSCGReport" IE
             •      setup the measurement gap configuration indicated by the *measGapConfig in SCG* in accordance with the received *gapOffsetSCG*, i.e., the first subframe of each gap occurs at an SFN and subframe meeting the following condition (SFN + SFN_offset) mod $T$ = FLOOR(*gapOffset*/10);
             subframe = *gapOffsetMCG* + *FrameTiming_Offset* mod 10;
             with $T$ = MGRP/10 as defined in TS 36.133 [16]
             •      If "IndicatorSyncDC" is true, only 6ms measurement gap will be configured for SCG. Otherwise 7ms measurement gap is needed.

FIG. 8

MEASUREMENT GAP CONFIGURATION IN DUAL CONNECTIVITY ENHANCEMENT

CROSS REFERENCE TO RELATED APPLICATIONS

The present application is a national phase entry under 35 U.S.C. § 371 of International Application No. PCT/US2015/000272, filed Dec. 23, 2015, entitled "MEASUREMENT GAP CONFIGURATION IN DUAL CONNECTIVITY ENHANCEMENT", which designates the United States of America, which claims priority under 35 U.S.C. § 119(e) to U.S. Provisional Patent Application No. 62/161,779 entitled "METHOD OF MEASUREMENT GAP CONFIGURATION IN DUAL CONNECTIVITY ENHANCEMENT" and filed May 14, 2015, the entire specifications of which are hereby incorporated by reference in their entireties for all purposes, except for those sections, if any, that are inconsistent with this specification.

FIELD

Embodiments of the present disclosure relate generally to the field of wireless communications, and more particularly, to enhancing a measurement gap configuration in dual connectivity.

BACKGROUND

LTE Release 12, $3^{rd}$ Generation Partnership Project (3GPP) supports dual connectivity (DC) for user equipment (UE). In the case of multi-vendor deployments, no network coordination via different operation and maintenance functions for DC may be assumed.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they may mean at least one. It should also be noted that references to an "example" are references to non-limiting examples, unless otherwise stated.

FIG. 7 is a text block illustrating an information element (IE) variable to add to indicate a timing offset of a SCG, according to embodiments.

FIG. 8 is a text block illustrating the use of a variable to indicate a timing offset of a SCG (TimingOffsetofSCGReport) to identify and/or align a measurement gap or DRX pattern between a MCG and SCG, according to embodiments.

DETAILED DESCRIPTION

Figure 1A:
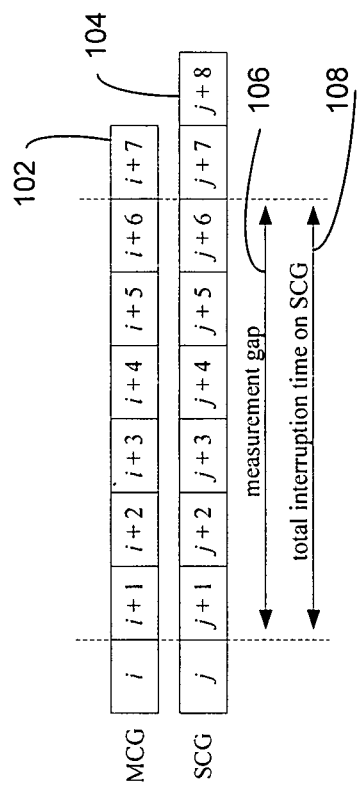
FIGS. 1A and 1B are diagrams illustrating a measurement gap for synchronous and asynchronous dual connectivity, according to embodiments.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various aspects of the illustrative embodiments will be described using terms commonly employed by those skilled in the art to convey the substance of their work to others skilled in the art. However, it will be apparent to those skilled in the art that many alternate embodiments may be practiced using portions of the described aspects. For purposes of explanation, specific numbers, materials, and configuration are set forth in order to provide a thorough understanding of the illustrative embodiments. However, it will be apparent to those skilled in the art that alternate embodiments may be practiced without the specific details. In other instances, well-known features are omitted or simplified in order to avoid obscuring the illustrative examples.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

As used herein, the term "circuitry" may refer to, be part of, or include an ASIC, an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, circuitry may be implemented in, or functions associated with the circuitry may be implemented by, one or more software or firmware modules.

In embodiments, a UE may measure system frame number (SFN)/subframe timing differences between a master eNB (MeNB) and secondary eNB (SeNB) for DC connectivity. When network-based reporting on the SFN/subframe timing offset is used, no new radio access network (RAN) signaling may be needed. However, in the case of multi-vendor deployments, no network coordination via different Operations, Administration, and Maintenance (OAM) for DC may occur. In this case, the network may not be able to obtain SFN/subframe timing offset information. To address this issue, various embodiments disclosed herein include UE-based reporting on SFN/subframe offset between an MeNB and an SeNB.

In embodiments, a network may obtain the SFN and subframe timing difference principally for use for discontinuous reception (DRX) pattern and measurement gap configuration. For example, the SFN and subframe timing difference may be obtained to determine the starting subframe index of DRX/measurement gap.

Figure 1B:
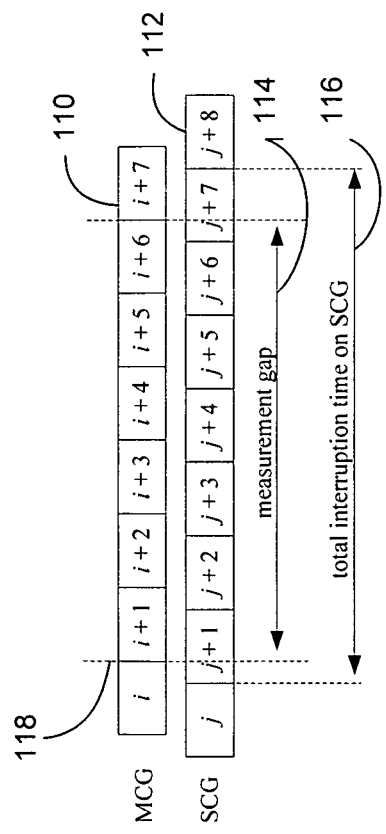

FIGS. 1A and 1B are diagrams illustrating a measurement gap for synchronous and asynchronous dual connectivity, according to embodiments. FIG. 1A illustrates a measurement GAP for synchronous dual connectivity. An MCG SFN representation 102 is shown in comparison to an SCG SFN representation 104, where the measurement gap 106 begins and ends on the same synchronized subframes, and is equal to the total interruption time on the SCG 108.

FIG. 1B illustrates a measurement GAP for asynchronous dual connectivity. An MCG SFN representation 110 is shown in comparison to an SCG SFN representation 104, where the measurement gap 112 does not begin and end on the same synchronized subframe. The, MCG measurement gap 114 may start at the beginning of MCG subframe i+1 118 which occurs within an SCG intra-frame location within subframe j+1 118. The total interruption time on the SCG 116 is not synchronized with the MCG.

Figure 2A:
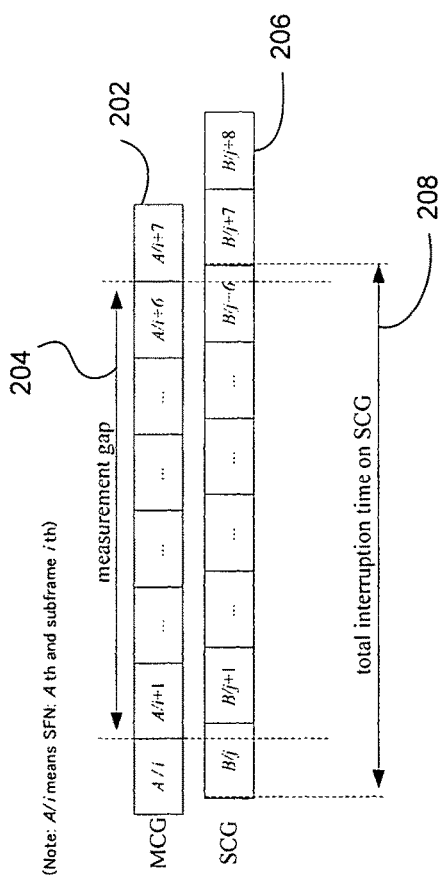
FIGS. 2A and 2B are diagrams illustrating example subframe number and frame boundary offsets for a master cell group (MCG) and a secondary cell group (SCG), according to embodiments.
Figure 2B:
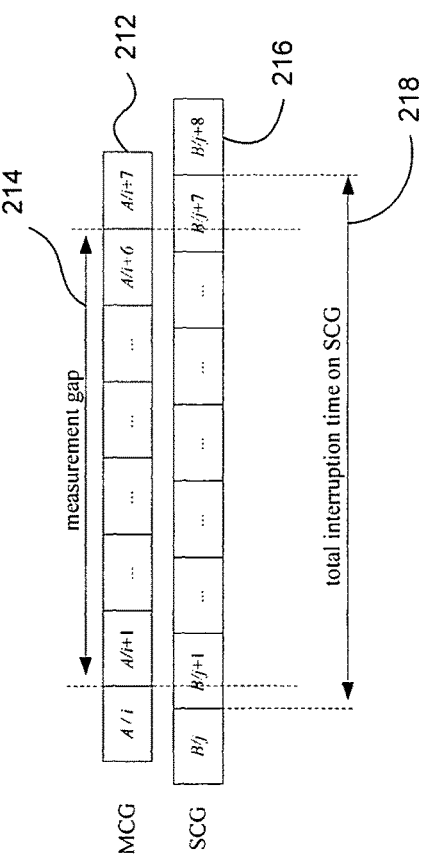

FIGS. 2A and 2B are diagrams illustrating example subframe number and frame boundary offsets for an MCG and an SCG, according to embodiments. FIG. 2A illustrates a measurement gap for asynchronous dual connectivity where the measurement gap 204 of the MGC 202 and the total interruption time on SCG 208 on the SCG 206 are at different intervals. As shown, the MCG is earlier than the SCG.

FIG. 2B illustrates a measurement gap for asynchronous dual connectivity were the measurement gap 214 of the MGC 212 in the total interruption time on SCG 218 on the SCG 216 are at different intervals. As shown, the MGC is later than the SGC.

Figure 3:
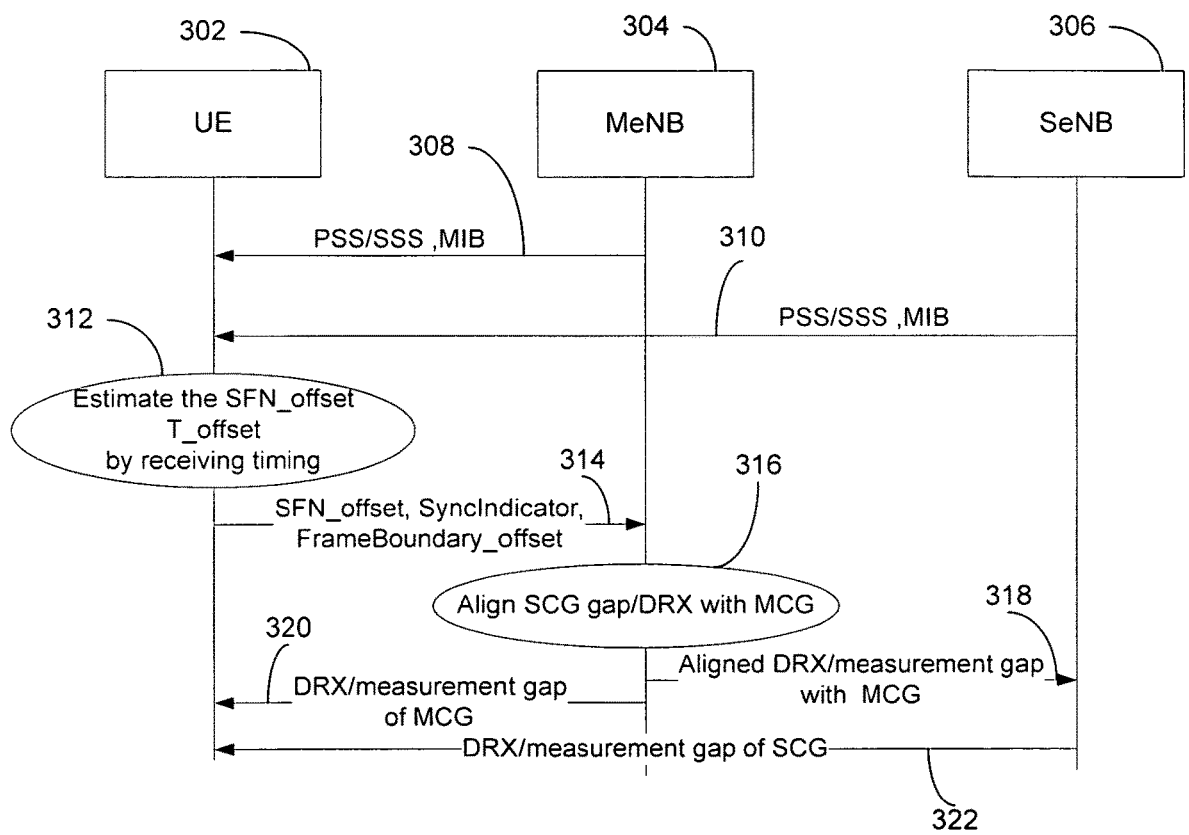
FIG. 3 is a diagram illustrating procedures to align a discontinuous reception (DRX) pattern and measurement gap occasion for a MCG and a SCG, according to embodiments.

FIG. 3 is a diagram illustrating procedures to align a DRX pattern and measurement gap occasion for an MCG and an SCG, according to embodiments. In embodiments, this may include UE reporting based measurement gap/DRX pattern configuration in DC in Long-Term Evolution (LTE).

A UE 302 may be in communication with a master eNB (MeNB) 304 communicating via an MCG 102, 110, 202, 212 and a secondary eNB (SeNB) 306 communicating via an SCG 104, 112, 206, 216.

In embodiments, to align the measurement gap between MCG and an SCG, the following information from UE 302 reporting may be used: an indication of synchronous or asynchronous DC; an SFN offset; and/or a frame boundary offset in subframe level.

In some embodiments, the MeNB 304 may synchronize with the UE 302 by sending a primary synchronizing signal (PSS) and/or a secondary synchronizing signal (SSS), and/or a master information block (MIB) 308. In some embodiments, the SeNB may synchronize with the UE 302 by sending a PSS and/or an SSS and/or a MIB 310.

In some embodiments, after the UE 302 synchronizes with the MeNB 304 and the SeNB 306 separately, the frame boundary timing of an MCG and an SCG may be obtained 312. The frame boundary timing may be denoted as "T_mcg" and "T_scg" and may be in units of microseconds, for example. The frame boundary timing offset between MCG and SCG may be obtained by:

$$T\_offset\_Frame = T\_mcg - T\_scg \quad (1)$$

The frame boundary offset reported to the network (in subframe granularity) may be estimated 312 in accordance with:

$$FrameTiming\_offset = floor(T\_offset/1000) \quad (2)$$

Alternatively, the frame boundary offset may be estimated in accordance with:

$$FrameTiming\_offset = abs(floor(T\_offset/1000))$$

if it is assumed that SCG frame timing is always ahead of that of MCG.

The SFN timing difference between MCG and SCG may be calculated from the received MIBs of MeNB and SeNB in accordance with:

$$SFN\_offset = SFN\_MCG - SFN\_SCG \text{ [Frame level]} \quad (3)$$

In embodiments, an indication of asynchronous/synchronous DC can be derived in accordance with the following code fragment:

If mod(abs(T_offset_Frame),500)<33

IndicatorSyncDC=true; (4-1)

Else

IndicatorSyncDC=false; (4-2)

end

In embodiments, UE 302 may report, at 314, the parameters FrameTiming_offset, IndicatorSyncDC and SFN_offset to the MeNB 304. In embodiments, new radio resource control (RRC) signaling may be used to report these parameters to the MeNB 304.

In some embodiments, based on these reported parameters, the MeNB 304 may configure the DRX pattern/gap offset in SCG to make them align with those of the MCG from the UE 302 perspective at 316 in accordance with the following:

If MCG measurement gap configuration is SFN in which the measurement gap is "m", wherein:

$$\mathrm{mod}(m, \mathrm{MGRP}/10) = \mathrm{Gap\_offset\_MCG\ inSubframe} \quad (5)$$

then, the SCG measurement gap configuration may be determined in accordance with the SFN index of the first subframe of SCG measurement gap "n", with the following code fragment:

When FrameTiming_offset>=0, $$\text{"}n\text{"} = m + \mathrm{SFN\_offset}; \quad (6\text{-}1)$$

else if FrameTiming_offset<0

$$\text{"}n\text{"} = m + \mathrm{SFN\_offset} - 1; \quad (6\text{-}2)$$

End.

The SCG measurement gap offset can be determined in accordance with:

$$\mathrm{Gap\_offset\_SCG\_inSubframe} = \mathrm{mod}(\mathrm{Gap\_offset\_MCG\_inSubframe} + \mathrm{SF\_offset}, 10) \quad (7)$$

In embodiments, the MeNB may forward the aligned MCG and SCG measurement gap/DRC to the SeNB 318.

MeNB 304 and SeNB 306 may schedule the data according to the aligned measurement gap/DRX pattern.

The MeNB 304 may inform the UE 302 of the measurement gap/DRX pattern at 320, which may be done through RRC signaling.

The SeNB may inform the UE of the measurement gap/DRX pattern at 322, which may also be done through RRC signaling.

Figure 4:
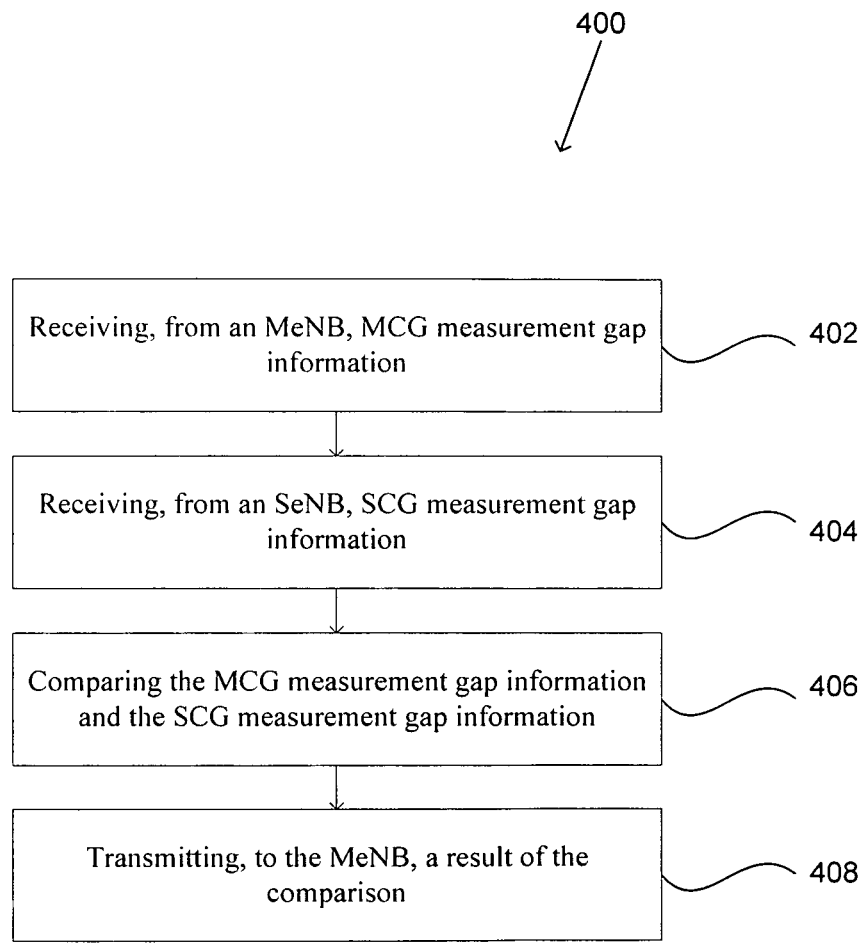
FIG. 4 is a flow diagram for aligning a DRX pattern and measurement gap occasion for a user equipment (UE), according to embodiments.

FIG. 4 is a flow diagram for aligning a DRX pattern and measurement gap occasion for a UE, according to embodiments. Process 400 may be implemented by a UE, such as UE 302.

At block 402, the process 400 may include receiving, from an MeNB, MCG measurement gap information. In embodiments, this may be similar to 308 of FIG. 3.

At block 404, the process 400 may include receiving, from an SeNB, SCG measurement gap information. In embodiments, this may be similar to 310 of FIG. 3.

At block 406, the process 400 may include comparing the MCG measurement gap information and the SCG measurement gap information. In embodiments, this may be similar to 312 of FIG. 3.

At block 408, the process 400 may include transmitting, to the MeNB, a result of the comparison. In embodiments, this may be similar to 314 of FIG. 3.

Figure 5:
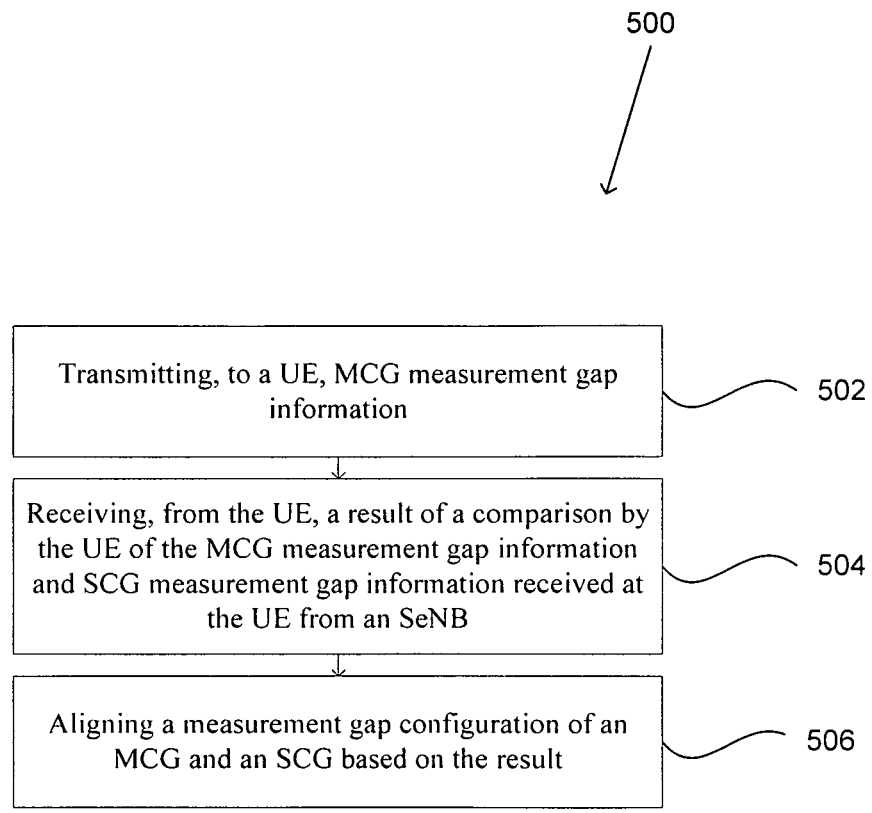
FIG. 5 is a flow diagram for aligning a DRX pattern and measurement gap occasion for an MCG evolved NodeB (eNB), according to embodiments.

FIG. 5 is a flow diagram for aligning DRX and measurement gap occasion for an MCG MeNB, according to embodiments. Process 500 may be implemented by an MeNB, such as MeNB 304.

At block 502, the process 500 may include transmitting, to a UE, MCG measurement gap information. In embodiments, this may be similar to 308 of FIG. 3.

At block 504, the process 500 may include receiving, from the UE, a result of a comparison by the UE of the MCG measurement gap information and SCG measurement gap information received at the UE from an SeNB. In embodiments, this may be similar to 314 of FIG. 3.

At block 506, the process 500 may include aligning a measurement gap configuration of an MCG and an SCG based on the result. In embodiments, this may be similar to 316 of FIG. 3.

Figure 6:
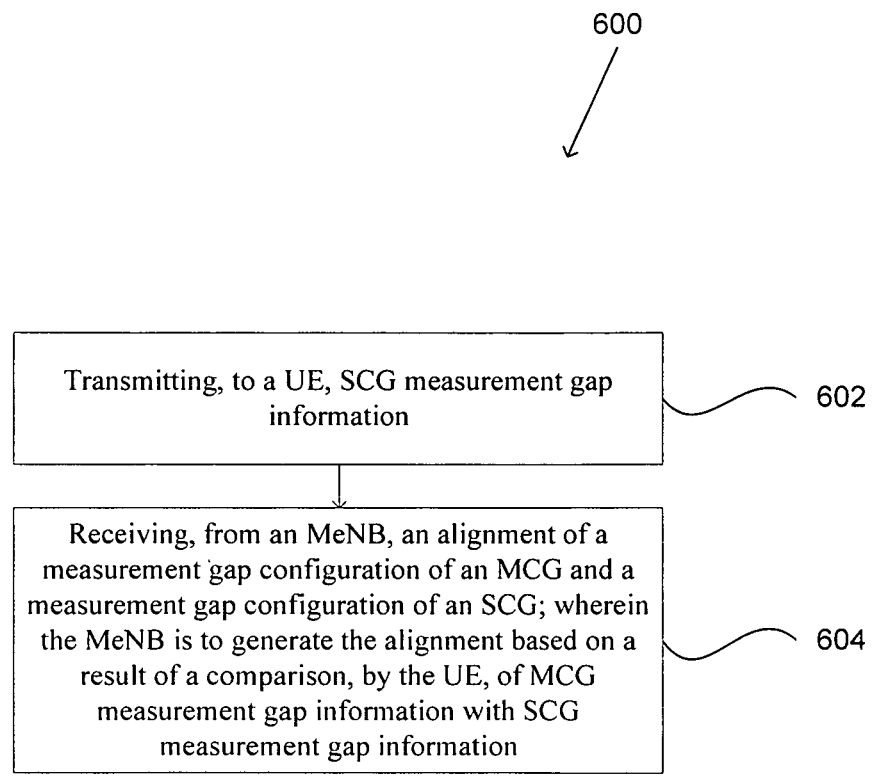
FIG. 6 is a flow diagram for aligning a DRX pattern and measurement gap occasion for an SDG eNB, according to embodiments

FIG. 6 is a flow diagram for aligning a DRX pattern and measurement gap occasion for an SDG eNB, according to embodiments. Process 600 may be implemented by an SeNB, such as ScNB 306.

At block 602, the process 600 may include transmitting, to a UE, SCG measurement gap information. This may be similar to 310 of FIG. 3

At block 604, the process 600 may include receiving, from an MeNB an alignment of a measurement gap configuration of an MCG and a measurement gap configuration of an SCG; wherein the MeNB is to generate the alignment based on a result of a comparison, by the UE, of MCG measurement gap information with SCG measurement gap information. This may be similar to 318 of FIG. 3.

FIG. 7 is a text block 700 illustrating an information element (1E) variable to add to indicate a timing offset of an SCG, according to embodiments. Text block 700 may include the UE variable TimingOffsetofSCGReport 704 that may include parameters to align the measurement gap or DRX between MCG and SCG. In embodiments, variable TimingOffsetofSCGReport 704 may be a vector of three variables: FrameTiming_offset 706; IndicatorSyncDC 708; and SFN_offset 710.

FIG. 8 is a text block illustrating the use of a variable to indicate a timing offset of an SCG (TimingOffsetofSCGReport) to identify and/or align a measurement gap or DRX pattern between an MCG and an SCG, according to embodiments. In embodiments, example text 802 may be added to the measurement gap configuration section of 3GPP TS 36.331 v12.5.0 (Mar. 27, 2015) to describe a DC measurement gap configuration of MCG and SCG.

Figure 9:
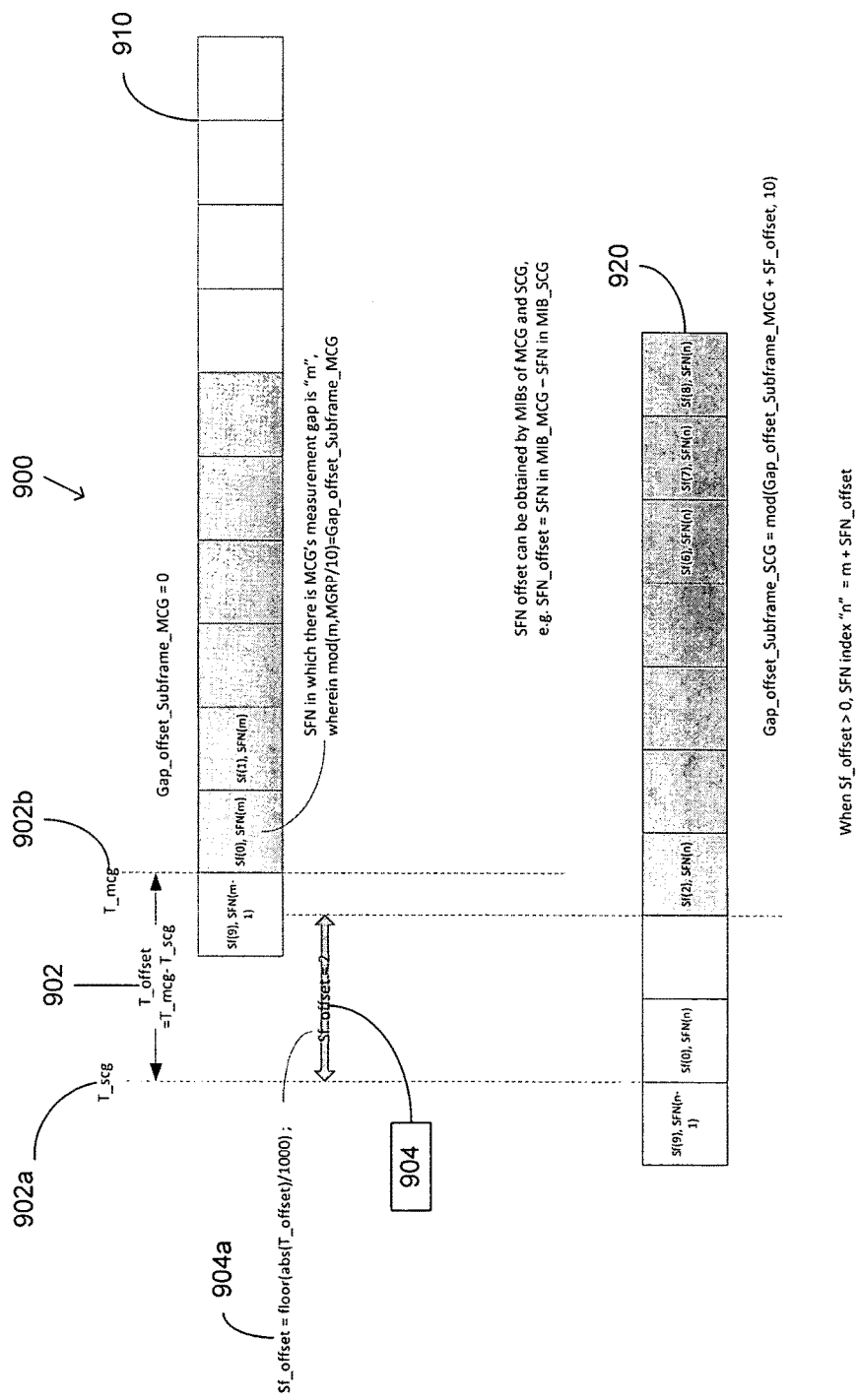
FIG. 9 is a diagram illustrating the determination of a measurement gap alignment where the SCG is ahead of the MCG, according to embodiments.

FIG. 9 is a diagram illustrating the determination of a measurement gap alignment where the SCG is ahead of the MCG, according to embodiments. Diagram 900 includes an example measurement gap alignment where the SCG is ahead of the MCG. In the diagram 900 a series of MCG subframes 910 are in comparison with a series of SCG subframes 920.

In embodiments, the timing offset (T_offset) 902 may be calculated by $$T\_\mathrm{offset} = T\_\mathrm{mcg} - T\_\mathrm{scg}$$

Where T_mcg 902b may be the frame start timing obtained by the UE synchronization with MCG in microseconds; and where T_scg 902a may be the frame start timing obtained by UE synchronization with SCG in microseconds.

The subframe offset (Sf_Offset) 902 in the diagram 900 is equal to 2 which, in embodiments, may be calculated as:

$$Sf\_\mathrm{offset} = \mathrm{floor}(\mathrm{abs}(T\_\mathrm{offset})/1000)$$

In embodiments, the SFN offset may be obtained by MIBs of MCG 910 and SCG 920. In one non-limning example, SFN_offset=SFN in MIB_MCG−SFN in MIB_SCG.

Figure 10:
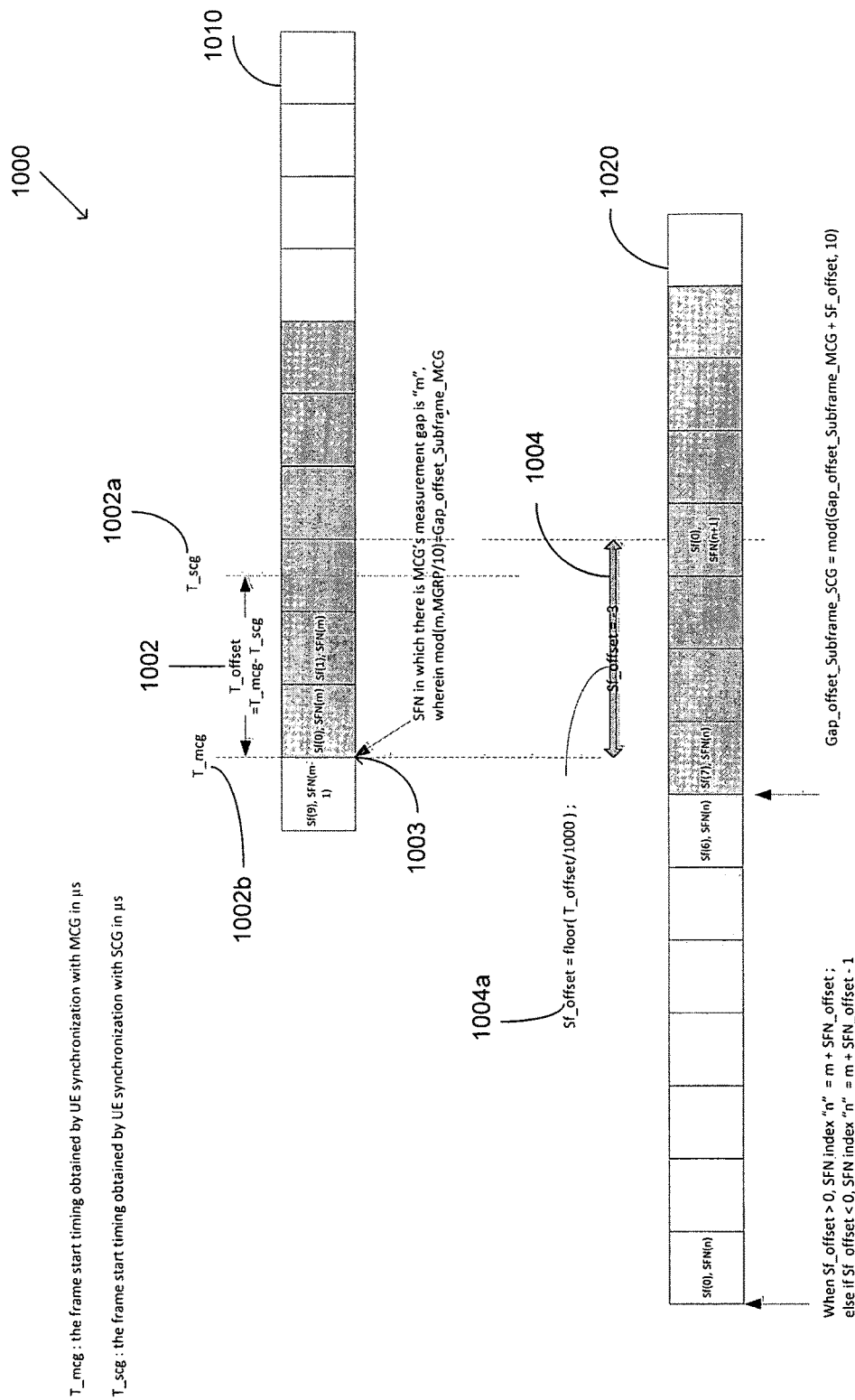
FIG. 10 is a diagram illustrating the determination of a measurement gap alignment where the SCG is behind the MCG, according to embodiments.

FIG. 10 is a diagram illustrating the determination of a measurement gap alignment where the SCG is behind the MCG, according to embodiments. Diagram 1000 includes an example measurement gap alignment where the SCG is behind the MCG. In the diagram 1000, a series of MCG subframes 1010 are in comparison with a series of SCG subframes 1020. In embodiments, the timing offset (T_offset) 1002 may be calculated by $$T\_\mathrm{offset} = T\_\mathrm{mcg} - T\_\mathrm{scg}$$

In embodiments, if the SFN in which there is a MCG measurement gap is "m" 1003, then the gap offset in the MCG (Gap_offset_Subframe_MCG) may be given by:

Gap_offset_Subframe_MCG=mod($m$,MGRP/10)

and the Sf_offset 1004a may be given by:

Sf_offset=floor($T$_offset/1000);

and the gap offset in the SCG (Gap_offset_Subframe_SCG) may be given by:

Gap_offset_Subframe_SCG=mod(Gap_offset_Subframe_MCG+SF_offset,10)

In diagram 1000, the Sf_offset=−3.

Figure 11:
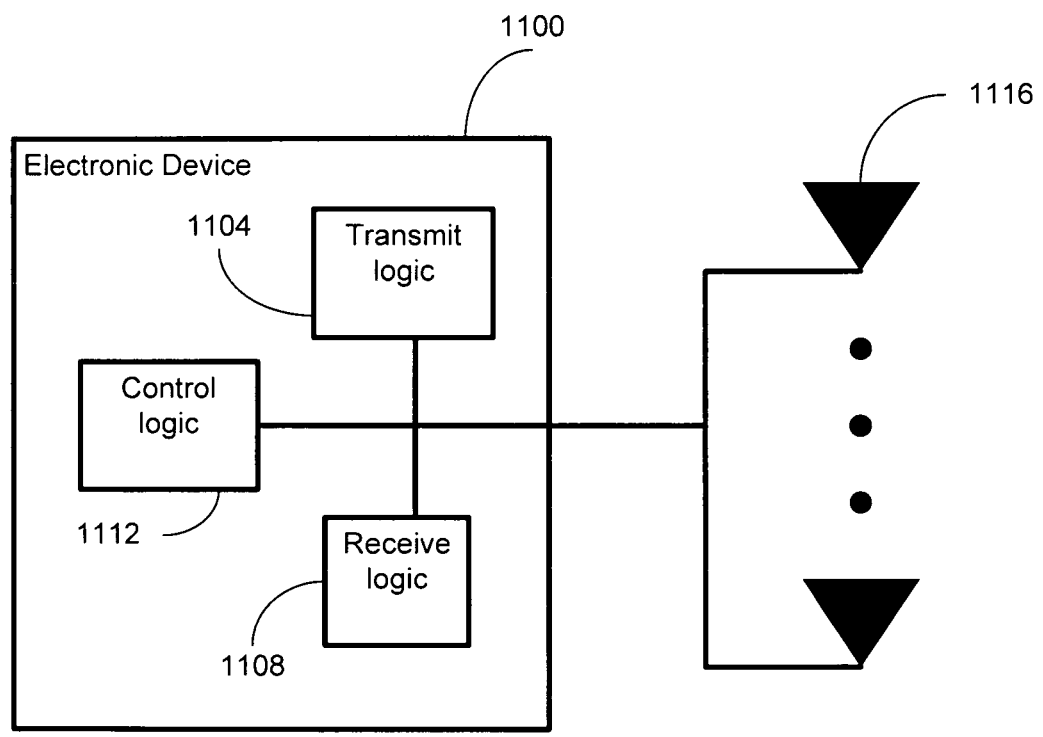
FIG. 11 illustrates a diagram of wireless communication apparatus such as a UE or an evolved NodeB (eNB), according to embodiments.

FIG. 11 illustrates a diagram of an electronic device 1100 that may be, or may be incorporated into or otherwise part of, a UE, an MeNB, an SeNB, or some other type of electronic device in accordance with various embodiments. Specifically, the electronic device 1100 may include logic and/or circuitry that may be at least partially implemented in one or more of hardware, software, and/or firmware. In embodiments, the electronic device 1100 may include transmit logic 1104 and receive logic 1108 coupled to control logic 1112. In embodiments, the transmit logic 1104 and/or receive logic 1108 may be elements or modules of transceiver logic. The electronic device 1100 may be coupled with or include one or more plurality of antenna elements of one or more antennas 1116. The electronic device 1100 and/or the components of the electronic device 1100 may be configured to perform operations similar to those described elsewhere in this disclosure.

In embodiments where the electronic device 1100 is a UE, or is incorporated into or otherwise part of a UE, the receive logic 1108 may receive MCG measurement gap information and/or SCG measurement gap information. The control logic 1112 may compare the MCG measurement gap information and the SCG measurement gap information. The transmit logic 1104 may transmit the result of the comparison.

In embodiments where the electronic device 1100 is an MeNB, or is incorporated into or otherwise part of an MeNB, the transmit logic 1104 may transmit MCG measurement gap information to a UE. The receive logic 1108 may receive from a UE a result of a comparison by the UE of the MCG measurement gap information and the SCG, measurement gap infrmation received at the UE from an SeNB. The control logic 1112 may align a measurement gap configuration of an MCG and an SCG based on the result of the comparison.

In embodiments where the electronic device 1100 is an SeNB, or is incorporated into or otherwise part of an SeNB, the transmit logic 1104 may transmit to a UE SCG measurement gap information. The receive logic 1108 may receive from an MeNB an alignment of a measurement gap configuration of a master cell group, MCG and a measurement gap configuration of an SCG, wherein the MeNB is to generate the alignment based on a result of a comparison, by the UE, of MCG measurement gap information with SCG measurement gap information.

As used herein, the term "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. Specifically, the logic may at be at least partially implemented in, or an element of, hardware, software, and/or firmware. In some embodiments, the electronic device logic may be implemented in, or functions associated with the logic may be implemented by, one or more software or firmware modules.

In some embodiments, the electronic device of FIG. 11 may be configured to perform one or more processes such as the process of FIGS. 4-6. For example, in embodiments where the electronic device is a UE, or is incorporated into or otherwise part of a UE, the process may include receiving from an MeNB, MCG, measurement gap information. The process may further include receiving, from a SeNB, SCG, measurement gap information. The process may further include comparing the MCG measurement gap information and the SCG measurement gap information. The process may further include transmitting, to the MeNB, a result of the comparison.

In embodiments where the electronic device is an MeNB, or is incorporated into or otherwise part of an MeNB, the process may include transmitting to a UE MCG, measurement gap information. The process may further include receiving, from the UE, a result of a comparison by the UE of the MCG measurement gap information and SCG measurement gap information received at the UE from a secondary eNodeB, SeNB. The process may further include aligning a measurement gap configuration of an MCG and an SCG based on the result of the comparison.

In embodiments where the electronic device is an SeNB, or is incorporated into or otherwise part of an SeNB, the process may include transmitting to a UE, SCG, measurement gap information. The process may further include receiving from an MeNB an alignment of a measurement gap configuration of a MCG and a measurement gap configuration of the SCG.

Figure 12:
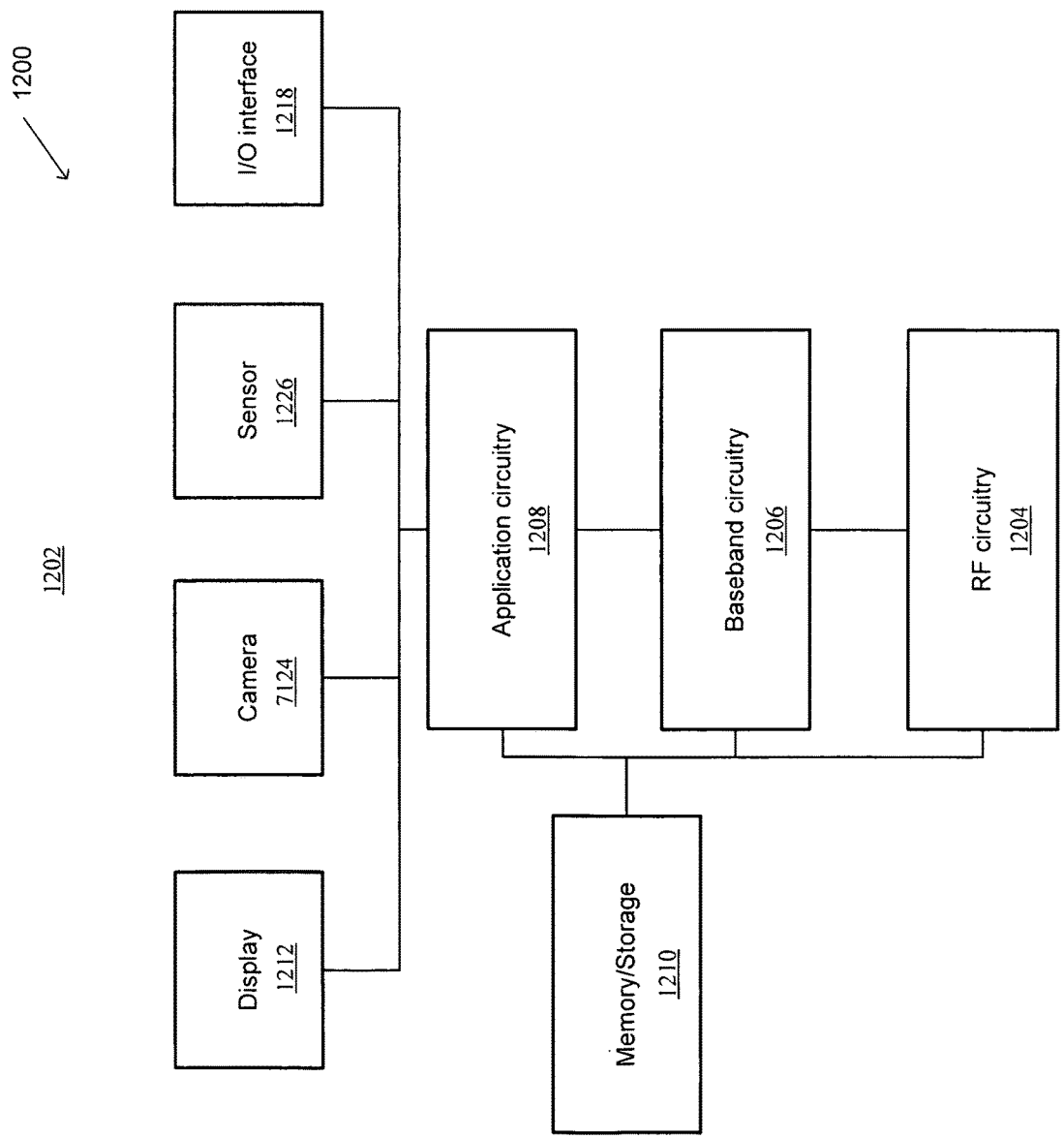
FIG. 12 illustrates a general block diagram of a wireless communication system in accordance with various embodiments.

Embodiments described herein may be implemented into a system using any suitably configured hardware and/or software. FIG. 12 illustrates a general block diagram of a wireless communication system 1200 in accordance with various embodiments of the disclosure including radio frequency (RF) circuitry 1210, baseband circuitry 1020, application circuitry 1230, memory/storage 1240, display 1250, camera 1260, sensor 1270, and input/output (I/O) interface 1280, coupled with each other at least as shown. The wireless communication system 1200 may implement an embodiment of the UE 302, MeNB 304, or the SeNB 306 of FIG. 3.

In embodiments where the wireless communication system 1200 may implement the UE 302, the RF circuitry 1204 may implement receiving from an MeNB, MCG, measurement gap information and may implement receiving, from a SeNB, SCG, measurement gap information. The baseband circuitry 1206 may implement comparing the MCG measurement gap information and the SCG measurement gap information. The RF circuitry 1204 may implement transmitting, to the MeNB, a result of the comparison.

In embodiments where the wireless communication system 1200 may implement an MeNB 304, the RF circuitry 1204 may implement transmitting to a UE MCG, measurement gap information. The RF circuitry 1204 may implement receiving, from the UE, a result of a comparison by the UE of the MCG measurement gap information and SCG measurement gap information received at the UE from a secondary eNodeB, SeNB. The baseband circuitry 1206 may implement aligning a measurement gap configuration of an MCG and an SCG based on the result of the comparison.

In embodiments where the wireless communication system 1200 may implement an SeNB, the RF circuitry 1204 may implement transmitting to a UE, SCG, measurement gap information, and may implement receiving from an MeNB an alignment of a measurement gap configuration of a MCG and a measurement gap configuration of the SCG.

The application circuitry 1230 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 1240 and configured to execute instructions stored in the memory/storage 1240 to enable various applications and/or operating systems running on the system.

The baseband circuitry 1220 may include circuitry such as, but not limited to, one or more single-core or multi-core processors. The processor(s) may include a baseband processor. The baseband circuitry 1220 may handle various radio control functions that enable communication with one or more radio networks via the RF circuitry 1210. The radio control functions may include, but are not limited to, signal modulation, encoding, decoding, radio frequency shifting, etc. In some embodiments, the baseband circuitry 1220 may provide for communication compatible with one or more radio technologies. For example, in some embodiments, the baseband circuitry 1220 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1220 is configured to support radio communications of more than one wireless protocol may be referred to as multi-mode baseband circuitry. In various embodiments, the baseband circuitry 1220 may include circuitry to operate with signals that are not strictly considered as being in a baseband frequency. For example, in some embodiments, the baseband circuitry 1220 may include circuitry to operate with signals having an intermediate frequency, which is between a baseband frequency and a radio frequency.

RF circuitry 1210 may enable communication with wireless networks using modulated electromagnetic radiation through a non-solid medium. In various embodiments, the RF circuitry 1010 may include switches, filters, amplifiers, etc. to facilitate the communication with the wireless network. In various embodiments, the RF circuitry 1210 may include circuitry to operate with signals that are not strictly considered as being in a radio frequency. For example, in some embodiments, the RF circuitry 1210 may include circuitry to operate with signals having an intermediate frequency, which is between a baseband frequency and a radio frequency.

In various embodiments, the above-described components of a UE, MeNB, or SeNB (e.g., processor, transmitter, measurement circuitry, memory, or RF circuitry) may be embodied in whole or in part in one or more of the RF circuitry 1210, the baseband circuitry 1220, and/or the application circuitry 1230. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

The memory/storage 1240 may be used to load and store data and/or instructions, for example, for system. The memory/storage 1240 for one embodiment may include any combination of suitable volatile memory (e.g., dynamic random access memory (DRAM)) and/or non-volatile memory (e.g., Flash memory).

In some embodiments, some or all of the constituent components of the baseband circuitry 1220, the application circuitry 1230, and/or the memory/storage 1240 may be implemented together on a system on a chip (SOC).

In various embodiments, the I/O interface 1280 may include one or more user interfaces designed to enable user interaction with the system 1200 and/or peripheral component interfaces designed to enable peripheral component interaction with the system 1200. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 1270 may include one or more sensing devices to determine environmental conditions and/or location information related to the system 1000. In some embodiments, the sensor 1270 may include, but are not limited to, a gyro sensor, an accelerometer, a proximity sensor, an ambient light sensor, and/or a positioning unit. The positioning unit may also be part of, or interact with, the baseband circuitry 1220 and/or RF circuitry 1210 to communicate with components of a positioning network, e.g., a global positioning system (GPS) satellite.

In various embodiments, the display 1250 may include a display (e.g., a liquid crystal display, a touch screen display, etc.). In various embodiments, the camera 1260 may include a semiconductor imaging device, e.g. a charge coupled device (CCD) imager and/or a complementary metal-oxide-semiconductor (CMOS) imager.

In various embodiments, the system 1200 may be a mobile computing device such as, but not limited to, a laptop computing device, a tablet computing device, a netbook, an Ultrabook™, a smart phone, etc. In various embodiments, the system 1200 may have more or less components, and/or different architectures. For example, in some embodiments the RF logic and/or the baseband logic may be embodied in communication logic (not shown). The communication logic may include one or more single-core or multi-core processors and logic circuits to provide signal processing techniques, for example, encoding, modulation, filtering, converting, amplifying, etc., suitable to the appropriate communication interface over which communications will take place. The communication logic may communicate over wireline, optical, or wireless communication mediums. In embodiments in which the system is configured for wireless communication, the communication logic may include the RF logic and/or baseband logic to provide for communication compatible with one or more radio technologies. For example, in some embodiments, the communication logic may support communication with an evolved universal terrestrial radio access network (EUTRAN) and/or other wireless metropolitan area networks (WMAN), a wireless local area network (WLAN), a wireless personal area network (WPAN).

Embodiments of the technology herein may be described as related to the third generation partnership project (3GPP) long term evolution (LTE) or LTE-advanced (LTE-A) standards. For example, terms or entities such as eNodeB (eNB), mobility management entity (MME), user equipment (UE), etc. may be used that may be viewed as LTE-related terms or entities. However, in other embodiments the technology may be used in or related to other wireless technologies such as the Institute of Electrical and Electronic Engineers (IEEE) 802.16 wireless technology (WiMax), IEEE 802.11 wireless technology (WiFi), various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed. In those embodiments, where LTE-related terms such as eNB, MME, UE, etc. are used, one or more entities or components may be used that may be considered to be equivalent or approximately equivalent to one or more of the LTE-based terms or entities.

EXAMPLES

Example 1 may be a user equipment, UE, apparatus, comprising: receive logic at least partially implemented in hardware to: receive, from a master eNodeB, MeNB, master cell group, MCG, measurement gap information, and receive, from a secondary eNodeB, SeNB, secondary cell group, SCG, measurement gap information; control logic at least partially implemented in hardware to compare the MCG measurement gap information and the SCG measurement gap information; and transmit logic to transmit, to the MeNB, a result of the comparison.

Example 2 may be the UE apparatus of Example 1, wherein the MeNB and/or SeNB measurement gap information includes: a primary synchronizing signal, PSS, and/or a secondary synchronizing signal, SSS, and/or a master information block, MIB.

Example 3 may be the UE apparatus of any one of Examples 1-2, wherein the result of the comparison includes a synchronization indicator representative of whether an MCG subframe boundary is synchronized to an SCG subframe boundary.

Example 4 may be the UE apparatus of any one of Examples 1-2, wherein the result of the comparison includes a system frame number, SFN, difference between an MCG and an SCG.

Example 5 may be the UE apparatus of any one of Examples 1-2, wherein the result of the comparison includes a frame boundary timing difference between an MCG and an SCG.

Example 6 may be the UE apparatus of Example 5, wherein the frame boundary timing difference is specified at a subframe level.

Example 7 may be the UE apparatus of any one of examples 1-6, wherein an SCG gap length is 6 milliseconds.

Example 8 may be a master eNodeB, MeNB, apparatus, comprising: transmit logic at least partially implemented in hardware to transmit, to a user equipment, UE, master cell group, MCG, measurement gap information; receive logic at least partially implemented in hardware to receive, from the UE, a result of a comparison by the UE of the MCG measurement gap information and secondary cell group, SCG, measurement gap information received at the UE from a secondary eNB, SeNB; and control logic at least partially implemented in hardware to align a measurement gap configuration of an MCG and an SCG based on the result of the comparison.

Example 9 may be the MeNB apparatus of Example 8, wherein the control logic is further to align a discontinuous reception, DRX, pattern of an MCG with a DRX pattern of an SCG based on the result of the comparison.

Example 10 may be the MeNB apparatus of any one of Examples 8-9, wherein the result of the comparison includes a synchronization indicator representative of whether an MCG subframe boundary is synchronized to an SCG subframe boundary.

Example 11 may be the MeNB apparatus of any one of Examples 8-9, wherein the result of the comparison includes a subframe number, SFN, difference between an MCG and an SCG.

Example 12 may be the MeNB apparatus of any one of Examples 8-9, wherein the result of the comparison includes a frame boundary timing difference between an MCG and an SCG.

Example 13 may be the MeNB apparatus of Example 12, wherein the frame boundary timing difference is specified at a subframe level.

Example 14 may be the MeNB apparatus of any one of Examples 8-13, wherein an SCG gap length is 6 milliseconds.

Example 15 may be the MeNB apparatus of any one of Examples 8-14, wherein the transmit circuitry is further to forward an aligned measurement gap configuration to the SeNB.

Example 16 may be the MeNB apparatus of any one of Examples 8-15, wherein the transmit circuitry is further to transmit, to the UE, an MCG measurement gap configuration.

Example 17 may be a secondary eNodeB, SeNB, apparatus, comprising: transmit logic to transmit, to a user equipment, UE, secondary cell group, SCG, measurement gap information; and receive logic to receive, from a master eNodeB, MeNB, an alignment of a measurement gap configuration of a master cell group, MCG and a measurement gap configuration of an SCG, wherein the MeNB is to generate the alignment based on a result of a comparison, by the UE, of MCG measurement gap information with SCG measurement gap information.

Example 18 may be the SeNB apparatus of Example 17, wherein the receive logic is further to receive, from the MeNB, an alignment of a discontinuous reception, DRX, pattern of the master cell group, MCG, with a DRX pattern of the SCG.

Example 19 may be the SeNB apparatus of any one of Examples 17-18, wherein an SCG gap length is 6 milliseconds.

Example 20 may be the SeNB apparatus of any one of Examples 17-18, wherein the transmit logic is to further provide, to the UE, an SCG measurement gap configuration.

Example 21 may be a method of wireless communication, comprising: receiving, by a user equipment, UE, from a Master eNodeB, MeNB, master cell group, MCG, measurement gap information; receiving, by the UE from a SeNB, secondary cell group, SCG, measurement gap information; comparing, by the UE, the MCG measurement gap information and the SCG measurement gap information; and transmitting, by the UE to the MeNB, a result of the comparison.

Example 22 may be the method of Example 21, wherein the measurement gap information includes: a primary synchronizing signal, PSS, and/or a secondary synchronizing signal, SSS, and/or a master information block, MIB.

Example 23 may be the method of any one of Examples 21-22, wherein the result of the comparison includes a synchronization indicator representative of whether an MCG subframe boundary is synchronized to an SCG subframe boundary.

Example 24 may be the method of any one of Examples 21-22, wherein the result of the comparison includes a subframe number, SFN, difference between an MCG and an SCG.

Example 25 may be the method of any one of Examples 21-22, wherein the result of the comparison includes a frame boundary timing difference between an MCG and an SCG.

Example 26 may be the method of Example 25, wherein the frame boundary timing difference is specified at a subframe level.

Example 27 may be the method of any one of Examples 21-22, wherein an SCG gap length is 6 milliseconds.

Example 28 may be a method of wireless communication, comprising: transmitting, by a master eNodeB, MeNB, to a user equipment, UE, master cell group, MCG, measurement gap information; receiving, by an MeNB, from the UE, a result of a comparison by the UE of the MCG measurement gap information and secondary cell group, SCG, measurement gap information received at the UE from an secondary eNodeB, SeNB; and aligning, by the MeNB, a measurement gap configuration of an MCG and an SCG based on the result of the comparison.

Example 29 may be the method of Example 28, further comprising aligning a discontinuous reception, DRX, pattern of an MCG with a DRX pattern of an SCG based on the result of the comparison.

Example 30 may be the method of any one of Examples 28-29, wherein the result of the comparison includes a synchronization indicator representative of whether an MCG subframe boundary is synchronized to an SCG subframe boundary.

Example 31 may be the method of any one of Examples 28-29, wherein the result of the comparison includes a subframe number, SFN, difference between an MCG and an SCG.

Example 32 may be the method of any one of Examples 28-29, wherein the result of the comparison includes a frame boundary timing difference between an MCG and an SCG.

Example 33 may be the method of Example 32, wherein the frame boundary timing difference is specified at a subframe level.

Example 34 may be the method of any one of Examples 28-29, wherein an SCG gap length is 6 milliseconds.

Example 35 may be a method of wireless communication, comprising: transmitting by a secondary evolved NodeB, SeNB, to a user equipment, UE, secondary cell group, SCG, measurement gap information; and receiving, by the SeNB, from a master eNodeB, MeNB, an alignment of a measurement gap configuration of a master cell group, MCG and a measurement gap configuration of an SCG, wherein the MeNB is to generate the alignment based on a result of a comparison, by the UE, of MCG measurement gap information with SCG measurement gap information.

Example 36 may be the method of Example 35, wherein the receive logic is further to receive, from the MeNB, an alignment of a discontinuous reception, DRX, pattern of the master cell group, MCG, with a DRX pattern of the SCG.

Example 37 may be the method of any one of Example 35-36, wherein an SCG gap length is 6 milliseconds.

Example 38 may be the method of any one of Example 35-36, wherein the transmit logic is to further provide, to the UE, an SCG measurement gap configuration.

Example 39 may be an apparatus comprising means to perform the method of any one of Examples 21-38.

Example 40 may be one or more non-transitory computer-readable media comprising instructions to cause an electronic device, upon execution of the instructions by one or more processors of the electronic device, to perform the method of any one of Examples 21-38.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

The invention claimed is:

1. A user equipment, UE, apparatus, comprising:
receive logic at least partially implemented in hardware to:
receive, from a master eNodeB, MeNB, master cell group, MCG, measurement gap information, and
receive, from a secondary eNodeB, SeNB, secondary cell group, SCG, measurement gap information;
control logic at least partially implemented in hardware to compare the MCG measurement gap information and the SCG measurement gap information; and
transmit logic to transmit, to the MeNB, based on a result of the comparison:
a synchronization indicator representative of whether an MCG subframe boundary is synchronized to an SCG subframe boundary,
a system frame number, SFN, difference between an MCG and an SCG, and
a frame boundary timing difference between an MCG and an SCG.

2. The UE apparatus of claim 1, wherein the MeNB and/or SeNB measurement gap information includes: a primary synchronizing signal, PSS, and/or a secondary synchronizing signal, SSS, and/or a master information block, MIB.

3. The UE apparatus of claim 1, wherein the frame boundary timing difference is specified at a subframe level.

4. The UE apparatus of claim 1, wherein an SCG gap length is 6 milliseconds.

5. A method of wireless communication, comprising:
receiving, by a user equipment, UE, from a Master eNodeB, MeNB, master cell group, MCG, measurement gap information;
receiving, by the UE from a SeNB, secondary cell group, SCG, measurement gap information;
comparing, by the UE, the MCG measurement gap information and the SCG measurement gap information; and
transmitting, by the UE to the MeNB, based on a result of the comparison:
a synchronization indicator representative of whether an MCG subframe boundary is synchronized to an SCG subframe boundary,
a system frame number, SFN, difference between an MCG and an SCG, and
a frame boundary timing difference between an MCG and an SCG.

6. The method of claim 5, wherein the measurement gap information includes: a primary synchronizing signal, PSS, and/or a secondary synchronizing signal, SSS, and/or a master information block, MIB.

* * * * *